April 21, 1925.  1,534,058

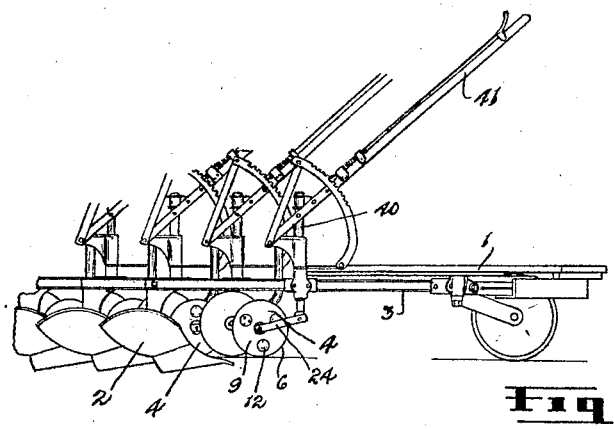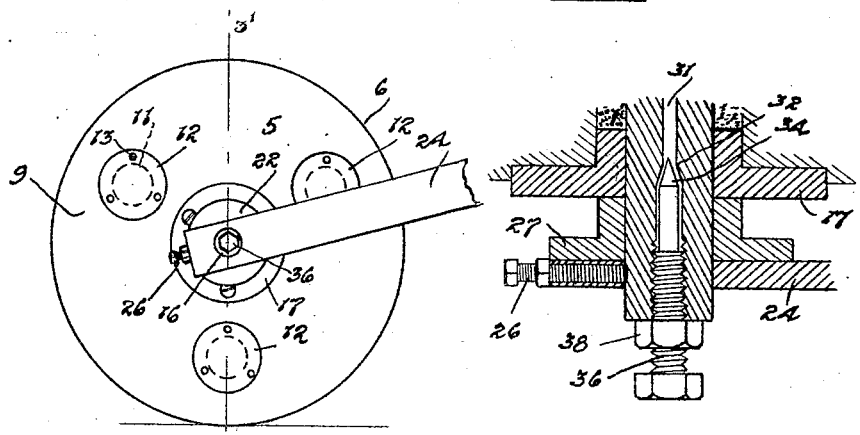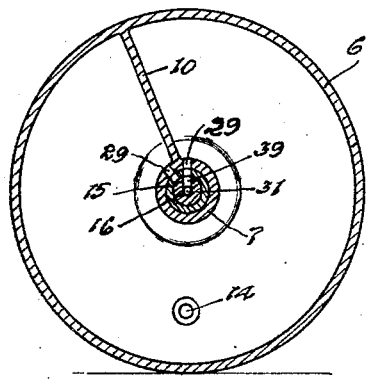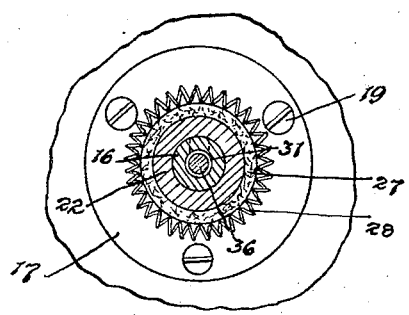

G. DENBIGH ET AL

PLOW GAUGE WHEEL

Original Filed Feb. 3, 1921   2 Sheets-Sheet 2

INVENTORS
G. Denbigh
R. Walker
BY
ATTYS

Patented Apr. 21, 1925.

1,534,058

UNITED STATES PATENT OFFICE.

GUY DENBIGH AND ROY WALKER, OF VULCAN, ALBERTA, CANADA.

PLOW GAUGE WHEEL.

Application filed February 3, 1921, Serial No. 442,164. Renewed October 15, 1924.

*To all whom it may concern:*

Be it known that we, GUY DENBIGH and ROY WALKER, both of the town of Vulcan, in the Province of Alberta, Canada, have invented certain new and useful Improvements in Plow Gauge Wheels, of which the following is the specification.

The invention relates to improvements in plow gauge wheels and particularly to the gauge wheels as used on engine gang plows and the object of the invention is to provide a wheel wherein particular attention has been directed to the lubricating features, thereby avoiding unnecessary wear due to faulty lubrication, also the loss of time and labor otherwise occasioned in making repairs.

A further object is to design the wheel and lubricating arrangement thereof such that the wheel will be self lubricating for a considerable period and the lubricating positive to all working parts.

A further object is to construct the wheel so that it is, comparatively speaking, dust proof.

With the above objects in view the invention consists essentially in the arrangement and construction of parts hereinafter more particularly described and later pointed out in the appended claims, reference being had to the accompanying drawing in which:—

Fig. 1 is a side view of a portion of an engine gang plow fitted with our invention.

Fig. 2 is an enlarged detailed side view of the gauge wheel.

Fig. 4 is a sectional view through the gauge wheel, the section being taken at 4—4' Fig. 3 and considerably reduced.

Fig. 5 is a vertical sectional view at 5—5' Fig. 3 with the spring shown in side elevation.

Fig. 6 is an enlarged horizontal sectional view at 6—6' Fig. 3.

In the drawing like characters of reference indicate corresponding parts in the several figures.

Figure 3:
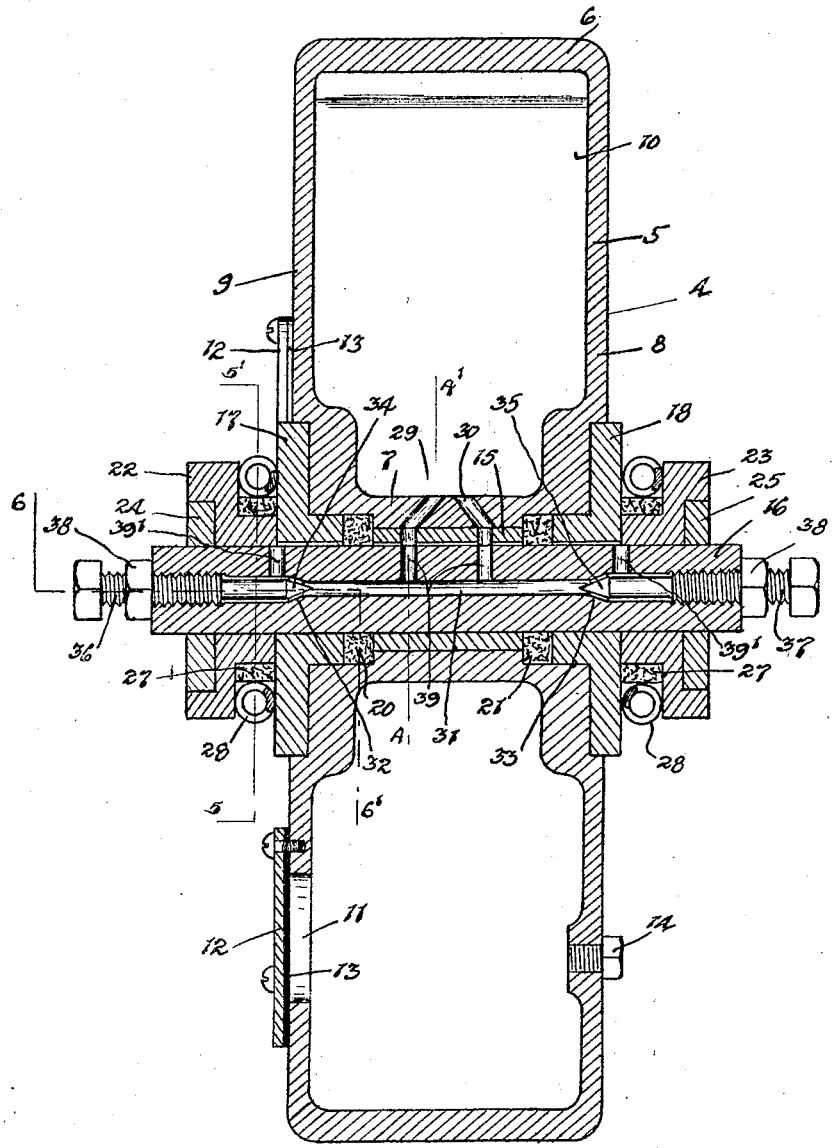
Fig. 3 is an enlarged sectional view centrally through the gauge wheel, the section being taken at 3—3' Fig. 2.

1 represents the customary platform of a gang plow and 2 the plows connected in the ordinary way by the plow beams 3 to the platform, it being understood that the gang plow is pulled by a traction engine as is customary.

In connection with the plow beams, the forward ends of which are pivotally connected to the platform frame or draw beam, it is usual to supply gauge wheels determining the depth of the plow cut.

At the present time most of the gauge wheels met with in practice are grease lubricated, the grease being fed by a grease cup to the wearing parts of the gauge wheel. We have found from actual experience that such a lubricating arrangement is not satisfactory as the gauge wheels invariably give trouble due to unsatisfactory lubrication and the consequent wear occasioned. Further, the wheels are not designed so that they are dust proof and in sandy or light soils trouble is invariably had due to the dust working into the bearings and damaging the parts.

The object of our invention as already set forth is to provide a gauge wheel which can be substituted for the older forms and which will not give any trouble from a lubricating or wearing standpoint.

The gauge wheels 4 which we provide for the plow are all identically constructed and each comprise the parts now described.

5 is a hollow wheel having the rim 6, hub 7 and sides 8 and 9 integrally cast and provided internally with a radially disposed cast web 10 extending from the hub to the rim and between the sides 8 and 9. The core holes 11 of the wheels are covered by cover plates 12 attached to the sides of the wheel by suitable screws, there being a gasket 13 inserted to prevent leakage of oil from the interior of the wheel. A screw plug 14 is provided in the side 8 of the wheel which allows one to put oil into the hollow centre of the wheel to a level of say four or five inches.

The hub 7 receives a bushing 15 which can be removed from time to time as occasion may demand and the bushing receives the wheel axle 16, the ends of which project considerably beyond the sides of the wheel.

17 and 18 are two similar gland plates mounted on the axle at opposite sides of the wheel and fastened to the wheel by suitable screws 19 having countersunk heads. The gland plates are formed with inwardly extending bosses which bear against felt or such like washers 20 and 21 mounted on the axle and positioned between the ends of the bushing and the bosses.

At the outer faces of the gland plates and on the axle we locate fork plates 22 and 23 which have their outer faces cross slotted to receive the customary forked arms 24 and 25 of the gauge wheel. The forked arms have their rear ends mounted on the ends of the axle to which they are permanently fastened by set screws 26 extending through the forks and engaging the axle (see Fig. 6). A lock nut is supplied on each of the latter set screws to prevent the same coming undone once adjusted.

Here it will be observed that the fork plates are also fitted at their inner sides with bosses extending to the outer faces of the gland plates. Felt or such like strips 27 are wound around these latter bosses between the gland and the fork plates and the said strips are retained in place by coil springs 28 provided.

The hub 7 and the bushing 15 are both provided with pairs of oil holes 29 and 30 leading from the hollow centre of the wheel, in a location adjoining the base or inner end of the web, to the bearing of the axle, thereby positively feeding oil to the axle each time the wheel turns. The axle is provided with a central lengthwise extending duct 31 which enlarges at the ends to provide two tapering valve seats 32 and 33, opposing which we have located two cone valves 34 and 35 formed at the inner ends of adjusting screws 36 and 37 screw threading into the ends of the axle and fitted with exterior heads. Lock nuts 38 are provided on these latter screws so that they will not work loose when once adjusted. Oil holes 39 are provided in the axle, these holes being positioned to register with the holes 29 and 30 in the turning of the wheel and to admit oil to the duct 31. Oil holes 39' also lead from the duct 31 out through the axle to the gland plates, these holes approaching to the outer sides of the felt washers 20 and 21 and serving to lubricate both the gland and the fork plates. The felt strips 27 serve to keep the dirt and dust out of the bearings and to retain the oil.

It will here be understood that the rear ends of the forked arms really span the wheel and associated parts whilst the forward ends are brought together and connected in the usual manner to the vertical adjusting spindle 40 controlled in its up and down movement by the adjusting lever 41. The means for adjusting the latter spindle forms no part of the present invention so that the same is not herein described in detail.

From the above description it will be apparent that when our gauge wheels are in use there is no possibility of dirt getting into the bearings and there is no trouble experienced in so far as the oiling of the wheel is concerned.

Each wheel contains a considerable supply of oil and is self-lubricating. Each time the wheel turns in either direction the web 10 virtually scoops up the oil so that it is directed towards the oil holes in the hub and bushing and through these holes to the axle, thereby fully lubricating the wheel as it turns on the axle which is stationary. Further, each time the holes in the axle register with those in the gasket and hub, oil passes to the central duct and finds its way through the outer holes to the gland and fork plates, the duct and associated holes acting as a by-pass for the oil.

We might mention also that by providing the adjusting screws 36 and 37 it is possible for one to clean out the axle when required and as may be occasioned through old oil becoming sticky.

Whilst we have described and shown two arms supporting the wheel, we wish it to be understood that this arrangement could be readily modified to suit conditions. These forks simply act as a support for the wheel and obviously the support could be varied to accommodate any existing condition as found in the present gang plows.

Whilst the invention has been described as applied on a plow gauge wheel, we wish it to be understood that it could be applied on any wheel requiring to be oiled.

What we claim as our invention is:—

1. The combination of a hollow wheel provided with an axial opening surrounded by a tubular wall constituting the hub of the wheel and internally formed to provide a shoulder adjacent each end of the hub, an axle journalled in the hub, gland plates having bearing on the axle at the ends of the hub, and packing material interposed between said plates and the aforementioned shoulders, said axle being provided with a longitudinal duct and a plurality of radial ducts interconnected by the said longitudinal duct, certain of said radial ducts being positioned intermediate the shoulders of the hub and adapted to register with openings formed in the latter during rotation of the wheel to permit oil to pass from the interior of the wheel to the said longitudinal duct, the remaining radial ducts of the axle being positioned to conduct oil to the bearing surfaces of the gland plates and needle valves mounted in the ends of the said longitudinal duct to control communication therebetween and the last-mentioned radial ducts.

2. The combination of a hollow wheel, an axle journalled in the hub of the wheel, gland plates having bearing on the axle at the ends of the hub, said axle and hub being provided with oil ducts arranged to conduct oil from the interior of the wheel to the bearing surfaces of the axle, hub and gland plates, fork plates mounted on the axle in abutting engagement with said gland plates, and packing material interposed between the fork plates and the gland plates to exclude dust from the oil passages formed in the axle and hub.

3. The combination of a hollow wheel, an axle journalled in the hub of the wheel, gland plates having bearing on the axle at the ends of the hub, said hub being formed to provide internal shoulders opposing said gland plates, packing material introduced between the gland plates and said shoulders, fork plates mounted on the axle in abutting engagement with said gland plates, packing material interposed between said fork plates and gland plates, and means for conducting oil from the hollow interior of the wheel to the bearing surfaces of the axle.

Signed at Vulcan, this 5th day of October 1920.

GUY DENBIGH.
ROY WALKER.

In the presence of—
HERBERT J. MABER,
ALKELL TEALL.